United States Patent
Connor et al.

(10) Patent No.: US 7,039,061 B2
(45) Date of Patent: May 2, 2006

(54) METHODS AND APPARATUS FOR RETAINING PACKET ORDER IN SYSTEMS UTILIZING MULTIPLE TRANSMIT QUEUES

(75) Inventors: Patrick L. Connor, Portland, OR (US); Linden Minnick, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1023 days.

(21) Appl. No.: 09/963,284

(22) Filed: Sep. 25, 2001

(65) Prior Publication Data

US 2003/0058876 A1    Mar. 27, 2003

(51) Int. Cl.
*H04L 12/28* (2006.01)
*H04J 3/14* (2006.01)
*G08C 15/00* (2006.01)
*G06F 11/00* (2006.01)

(52) U.S. Cl. .................. 370/429; 370/230; 370/412; 709/235

(58) Field of Classification Search ........ 370/429–432, 370/229–230, 389–395, 413–428; 709/213–223, 709/230–250
See application file for complete search history.

(56) References Cited

U.S. PATENT DOCUMENTS

| | | | | |
|---|---|---|---|---|
| 5,371,864 A | * | 12/1994 | Chuang | 712/206 |
| 5,699,519 A | * | 12/1997 | Shiobara | 709/235 |
| 6,064,677 A | * | 5/2000 | Kappler et al. | 370/395.43 |
| 6,091,709 A | * | 7/2000 | Harrison et al. | 370/235 |
| 6,259,699 B1 | * | 7/2001 | Opalka et al. | 370/398 |
| 6,377,583 B1 | * | 4/2002 | Lyles et al. | 370/412 |
| 6,404,772 B1 | * | 6/2002 | Beach et al. | 370/443 |
| 6,438,135 B1 | * | 8/2002 | Tzeng | 370/412 |
| 6,466,580 B1 | * | 10/2002 | Leung | 370/412 |
| 6,480,911 B1 | * | 11/2002 | Lu | 710/54 |
| 6,515,963 B1 | * | 2/2003 | Bechtolsheim et al. | 370/229 |
| 6,570,876 B1 | * | 5/2003 | Aimoto | 370/389 |
| 6,654,376 B1 | * | 11/2003 | Stacey et al. | 370/395.21 |
| 6,661,788 B1 | * | 12/2003 | Angle et al. | 370/390 |
| 6,724,721 B1 | * | 4/2004 | Cheriton | 370/229 |
| 6,732,209 B1 | * | 5/2004 | Cherukuri et al. | 710/240 |
| 6,829,217 B1 | * | 12/2004 | Bechtolsheim et al. | 370/229 |
| 2002/0097733 A1 | * | 7/2002 | Yamamoto | 370/412 |
| 2002/0186703 A1 | * | 12/2002 | West et al. | 370/413 |

* cited by examiner

*Primary Examiner*—Man U. Phan
(74) *Attorney, Agent, or Firm*—Blakely, Sokoloff, Taylor & Zafman LLP

(57) ABSTRACT

Methods, apparatus, and articles of manufacture for retaining packet order in multiprocessor systems utilizing multiple transmit queues are disclosed herein. Embodiments of the present invention define multiple transmit queues for a given priority level of packets to enable the multiprocessor system to process and queue packets of equal priority in different transmit queues. Queuing packets of equal priority in different transmit queues minimizes processor time spent attempting to acquire queue-specific resources associated with one particular transmit queue. In addition, embodiments of the present invention provide an assignment mechanism to ensure that packets corresponding to a common flow are queued in the same transmit queue in order to eliminate, to the extent possible, out-or-order packets, which many times results in lost packets and a reduction in realized network throughput.

24 Claims, 4 Drawing Sheets

METHODS AND APPARATUS FOR RETAINING PACKET ORDER IN SYSTEMS UTILIZING MULTIPLE TRANSMIT QUEUES

TECHNICAL FIELD OF THE INVENTION

This disclosure relates to network communications, and more particularly, but not exclusively, to methods, apparatus, and articles of manufacture for processing multiple transmit requests in parallel while retaining packet order within a flow to reduce the potential that packets may be received out-of-order by a destination node on a network, and consequently lost.

BACKGROUND INFORMATION

Many modern network adapters are configured to include multiple transmit queues. Typically, multiple transmit queues are made available in order to provide enhanced quality of service ("QoS"), the preferential treatment of some packets over others, by providing queues of varying priority levels (e.g., one queue per priority level), into which packets may be deposited while awaiting transmission on a network. Many network communication protocols, such as Internet Protocol, version 6 ("IPv6") (IETF draft standard RFC 2460, December 1998, "Internet Protocol, Version 6 (IPv6) Specification") provide a capability to specify a priority for the packet as a part of an IP header. Providing queues of varying priority levels enables the network adapter to transmit higher priority packets before lower priority packets, even though the higher priority packets may have been queued subsequent to the lower priority packets.

Because packets within the same flow (a single communication may comprise one or multiple packets depending on the size of the communication) will be designated with the same priority, providing one queue per priority level ensures that packets will be sent in the same order in which they were processed by a protocol stack, thereby eliminating, to the extent possible, the potential that the packets will be received out-of-order at the destination node on the network. While not an issue in regard to all communication protocols, the order in which packets are transmitted and received can represent a problem for some communication protocols and particularly one widely used communication protocol, Transmission Control Protocol ("TCP") (IETF standard RFC 793, Sep. 1, 1981, "Transmission Control Protocol"). In one implementation of TCP for example, if a packet is received out-of-order (i.e., the order in which it was processed by the protocol stack) by more than a small margin (e.g., a swap with an adjacent packet), it will be considered lost, and will have to be retransmitted. Providing one queue per one or more priority levels helps to alleviate this problem because all packets of equal priority will be deposited in the same queue. However, in network environments in which a protocol that does not include a priority indicating feature is in use, or the protocol in use supports fewer levels of priority than there are queues available with a network adapter, at least a portion of the multiple transmit queues associated with the network adapter remain unused.

The reader will appreciate that a packet comprises a package of information transmitted as a single unit from a source node on a network to a destination node on the network, and typically includes data, as well as addressing, routability, and reliability information in the form of headers and/or footers to enable the network's communication protocols to deliver the data within the packet to the intended recipient, and to ensure that the data arrives intact and without corruption. As transmit requests are generated from applications in response to user input or otherwise, the transmit requests are transferred to a protocol stack, such as a Transmission Control Protocol/Internet Protocol ("TCP/IP") protocol stack for encapsulation into the packet. After incorporating the data and other information into the packet, the packet is transferred to a device driver associated with a network adapter to be placed in a queue, awaiting transmission on the network. The device driver generally comprises a software component that permits a computer system to communicate with a device (e.g., a network adapter), and manipulates data in order to transmit data to the device (e.g., depositing packets in a queue and informing the network adapter that packets are waiting to be transmitted).

In a multiprocessor system, it is possible to have multiple transmit requests arrive at a "send packet" function of the device driver simultaneously on different processors. As mentioned previously, if the packets of the transmit requests are of equal priority, different priorities that are sharing a queue, or a priority-indicating protocol is not being used, then the packets will be deposited in the same queue to await transmission on the network. In order to provide access to the "send packet" function resources associated with a particular queue, the device driver may use semaphores to indicate to potential users that the "send packet" function resources associated with the particular queue are in use, thereby preventing access by more than one thread.

In a Windows® operating system environment for example, the semaphores are referred to as "spinlocks." Spinlocks guarantee that only one process at a time will be given access to a particular resource, thereby ensuring data integrity within the resource. As a consequence of the foregoing, when a second processor, for example, attempts to acquire a resource (e.g., a queue specific element of the "send packet" function) that is already being used by a first processor, for example, the second processor "spins," and waits for the spinlock to be released. While waiting for the spinlock to be released, the second processor remains in a "busy wait," and is not free to perform other tasks. Often, in network environments designed for high throughput levels (e.g., gigabit or 10 gigabit connections), the throughput level of the network connection itself may be limited by processor bandwidth, particularly, cycles spent preparing and processing network transmit requests.

BRIEF DESCRIPTION OF THE VARIOUS VIEWS OF THE DRAWINGS

In the drawings, like reference numerals refer to like parts throughout the various views of the non-limiting and non-exhaustive embodiments of the present invention, and wherein.

DETAILED DESCRIPTION OF THE ILLUSTRATED EMBODIMENTS

Embodiments of methods, apparatus, and articles of manufacture for retaining packet order in systems utilizing multiple transmit queues are described in detail herein. In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, embodiments of the invention provide methods, apparatus, and articles of manufacture to define multiple queues per priority level, or priority level group, to enable parallel processing of multiple transmit requests, corresponding to packets of equal priority, or to packets having priorities corresponding to a common priority level group, that may be received substantially simultaneously at different processors within a multiprocessor system. Another aspect of embodiments of the present invention includes providing an assignment mechanism, such as a hashing algorithm, to ensure that packets corresponding to the same flow are processed in series and queued in the same transmit queue to maintain packet order and reduce the potential for out-of-order packets, which may result in lost packets and a reduction in the throughput capabilities of the network link. Other features of the illustrated embodiments will be apparent to the reader from the foregoing and the appended claims, and as the detailed description and discussion is read in conjunction with the accompanying drawings.

Figure 1:
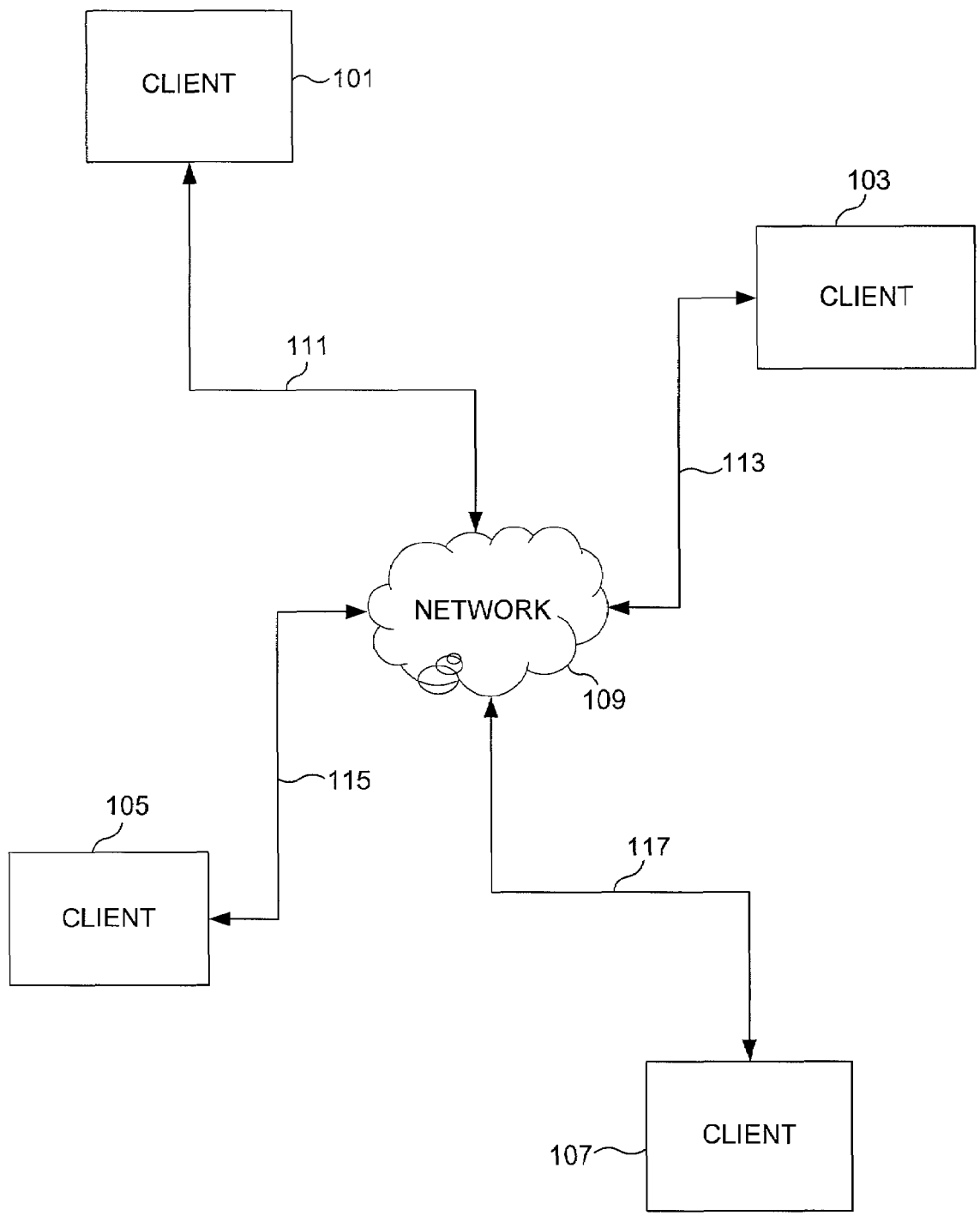
FIG. 1 is a block diagram illustrating one embodiment of a network environment in accordance with the teachings of the present invention.

Referring now to the drawings, and in particular to FIG. 1, there is illustrated a network environment in accordance with the teachings of the present invention. In one embodiment, the network environment comprises a plurality of clients 101, 103, 105, and 107 interconnected via a network 109 by a plurality of communication links 111, 113, 115, and 117, respectively. The network 109 may be any type of communications network through which a plurality of different devices may communicate, such as for example, but not limited to, a public switched telephone network ("PSTN"), an Internet, an intranet, an extranet, a wide area network ("WAN"), a local area network ("LAN"), or other network or combination of networks to enable communication among various networks, or between any of the illustrated components connected to the network(s), or other components. The communication links 111, 113, 115, and 117 between the clients 101, 103, 105, and 107, respectively, and the network 109 may comprise wires, cables, optical fibers, or other physical connections in various embodiments of the invention. In other embodiments, the communication links 111, 113, 115, and 117 may comprise a plurality of wireless links utilizing some portion of the electromagnetic spectrum, such as for example, but not limited to, radio frequency or infrared signals. In still other embodiments, the communication links 111, 113, 115, and 117 may comprise an optical link, or any combination of the foregoing.

Figure 2:
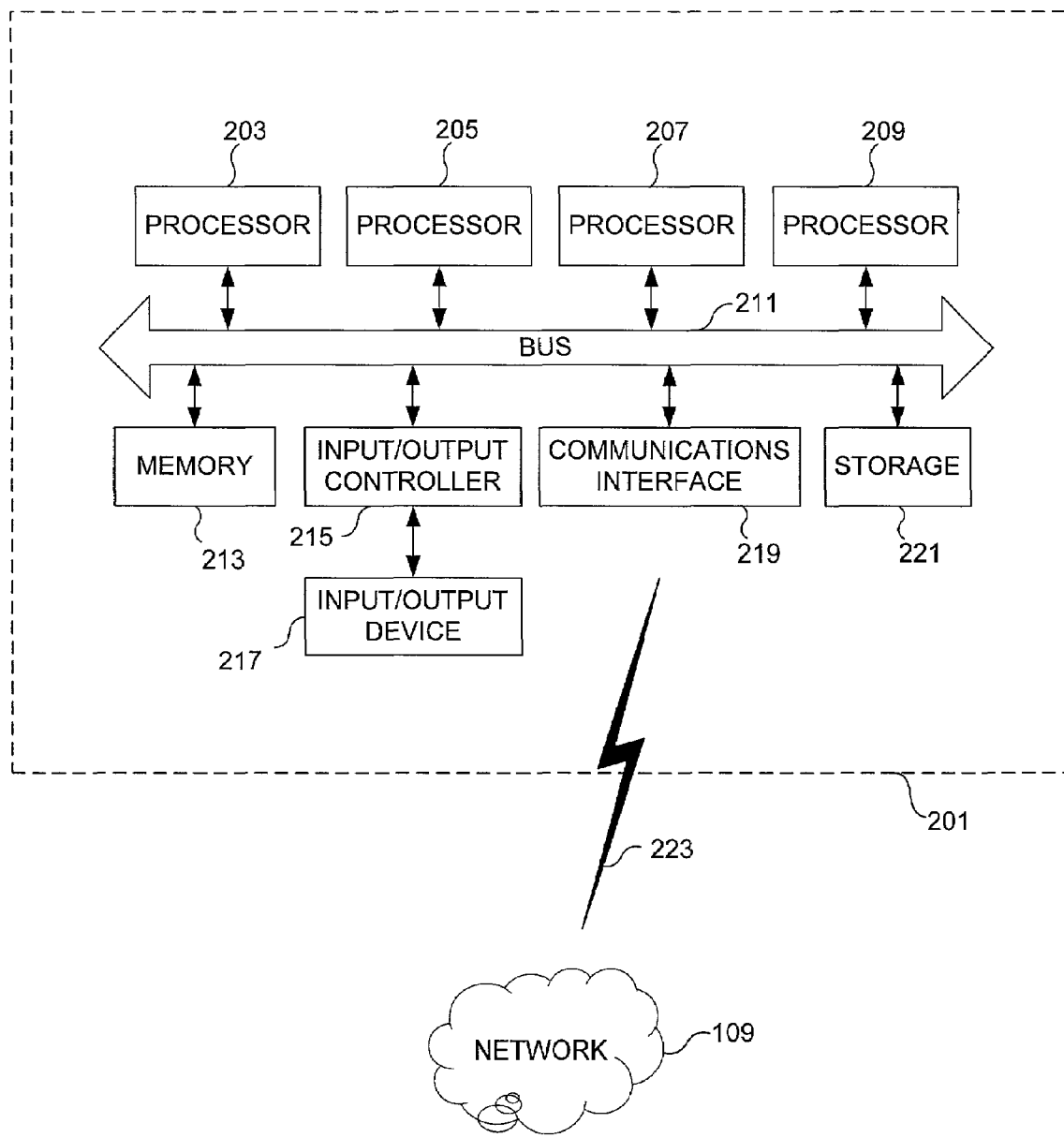
FIG. 2 is a block diagram illustrating a computer system representative of a client in accordance with the teachings of the present invention.

FIG. 2 is a block diagram illustrating one embodiment of a machine 201 that maybe used for the clients 101, 103, 105, and 107 in accordance with the teachings of the present invention. Typically, the clients 101, 103, 105, and 107 may comprise various types of machines, including a desktop computer or a workstation, a laptop computer, a personal computer, or the like. In one embodiment, the machine 201 is a computer that includes a plurality of processors 203, 205, 207, and 209 coupled to a bus 211. In one embodiment, a memory 213, a storage 221, a communications interface 219, and an input/output controller 215 are also coupled to the bus 207.

In one embodiment, the machine 201 interfaces to external systems, such as the network 109, through the communications interface 219. The communications interface 219 may include a radio transceiver compatible with various modulated signals, wireless telephone signals, or the like. The communications interface 219 may also include an Ethernet adapter, an analog modem, Integrated Services Digital Network ("ISDN") modem, cable modem, Digital Subscriber Line ("DSL") modem, a T-1 line interface, a T-3 line interface, an optical carrier interface (e.g., OC-3), token ring interface, satellite transmission interface, a wireless interface, or other interfaces for coupling a device to other devices.

In one embodiment, a carrier wave signal 223 is received/transmitted between the communications interface 219 and the network 109. In one embodiment, the communications signal 223 may be used to interface the machine 201 with another computer system, a network hub, a router, or the like. In one embodiment, the carrier wave signal 223 is considered to be machine-readable media, which may be transmitted through wires, cables, optical fibers, or through the atmosphere, or the like.

In one embodiment, the processors 203, 205, 207, and 209 may be conventional processors, such as for example, but not limited to, an Intel x86 processor, or Pentium family microprocessor, a Motorola family microprocessor, or the like. The memory 213 may be a machine-readable medium such as dynamic random access memory ("DRAM"), and may include static random access memory ("SRAM"). An input/output device 217, coupled to the input/output controller 215 may be a keyboard, a disk drive, a printer, a scanner, or other input/output device, including a television remote, a mouse, a trackball, a trackpad, a joystick, or the like.

The storage 221, in one embodiment, may include machine-readable media such as for example, but not limited to, a magnetic hard disk, a floppy disk, an optical disk, a read-only memory component ("ROM"), a smart card, or another form of storage for data. In one embodiment, the storage 221 may include removable media, read-only memory, readable/writable memory, or the like. Some of the data may be written by a direct memory access process into the memory 213 during execution of software in the computer system 201. It will be appreciated that software may reside in the storage 221, the memory 213, or may be transmitted or received via a modem or a communications interface 219. For the purpose of the specification, the term "machine-readable medium" shall be taken to include any medium that is capable of storing data, information, or encoding a sequence of instructions or operations for execution by the processors 203, 205, 207, and 209 to cause the processors 203, 205, 207, and 209 to perform the methodologies of the present invention. The term "machine-readable medium" shall be understood to include, for example, solid-state memories; ROM; random access memory ("RAM"); magnetic disk storage media; optical storage media; flash memory devices; electrical, optical, acoustical or other form of propagated signals (e.g., carrier tones, infrared signals, and digital signals); and the like.

It will be appreciated that other components may be included or substituted for those shown in the illustrated embodiment without departing from the spirit of the present invention. For example, the machine 201 illustrated in FIG. 2 may include a greater or lesser number of processors (such as, e.g., processors 203, 205, 207, and 209), and may include other components such as a display controller, an audio controller, or the like.

With continued reference now primarily to FIGS. 1 and 2, in one embodiment in accordance with the teachings of the present invention, the communications interface 219 comprises a network adapter configured to provide multiple transmit queues for queuing packets awaiting transmission on the network 109. It will be appreciated that in one embodiment, the multiple transmit queues comprise memory allocations within the memory 213, for example, and are not physically a part of the communications interface 219. In one embodiment, the communications interface 219 includes a communications memory (not shown), which may include a plurality of registers to inform the communications interface 219 of the location of the memory allocations comprising the multiple transmit queues.

In accordance with the teachings of the present invention, the multiple transmit queues may be configured, by a device driver at system initialization for example, to define at least two queues for a given priority level, or group of priority levels ("priority level group") supported by a network communication protocol. The priority level group may comprise a single priority level in one embodiment of the present invention. In other embodiments, the priority level group may comprise two or more priority levels. The network communication protocol may correspond to a protocol (e.g., IPv6) being utilized by the plurality of clients 101, 103, 105, and 107 to communicate information on the network 109, in an embodiment. It will be appreciated that in circumstances in which the communication protocol being used by the clients 101, 103, 105, and 107 to communicate information on the network 109 does not support the designation of priority levels for packets, all available transmit queues may be defined for the same "priority" (e.g., none will have a higher or lower transmission priority than any other), in an embodiment. For example, if a network adapter provides for sixteen transmit queues and the communications protocol provides eight levels of priority, then two transmit queues may be defined for each level of priority, in one embodiment. Defining multiple transmit queues per priority level, or priority level group, permits the multiprocessor system (e.g., such as the machine 201 illustrated in FIG. 2) to process transmit requests, including those corresponding to packets of equal priority, or those having priorities corresponding to a common priority level group, substantially in parallel, and thereby alleviate any network throughput limitations or wasted CPU cycles associated with the processing of transmit requests of the same priority simultaneously. It will be appreciated that the ability to process transmit requests in parallel is particularly relevant in situations in which a communications protocol having no priority-indicating feature is in use because all packets would, without reference to the present invention, be queued in the same transmit queue, thereby preventing utilization of the multiple processors to increase a rate at which transmit requests are processed.

Figure 3:
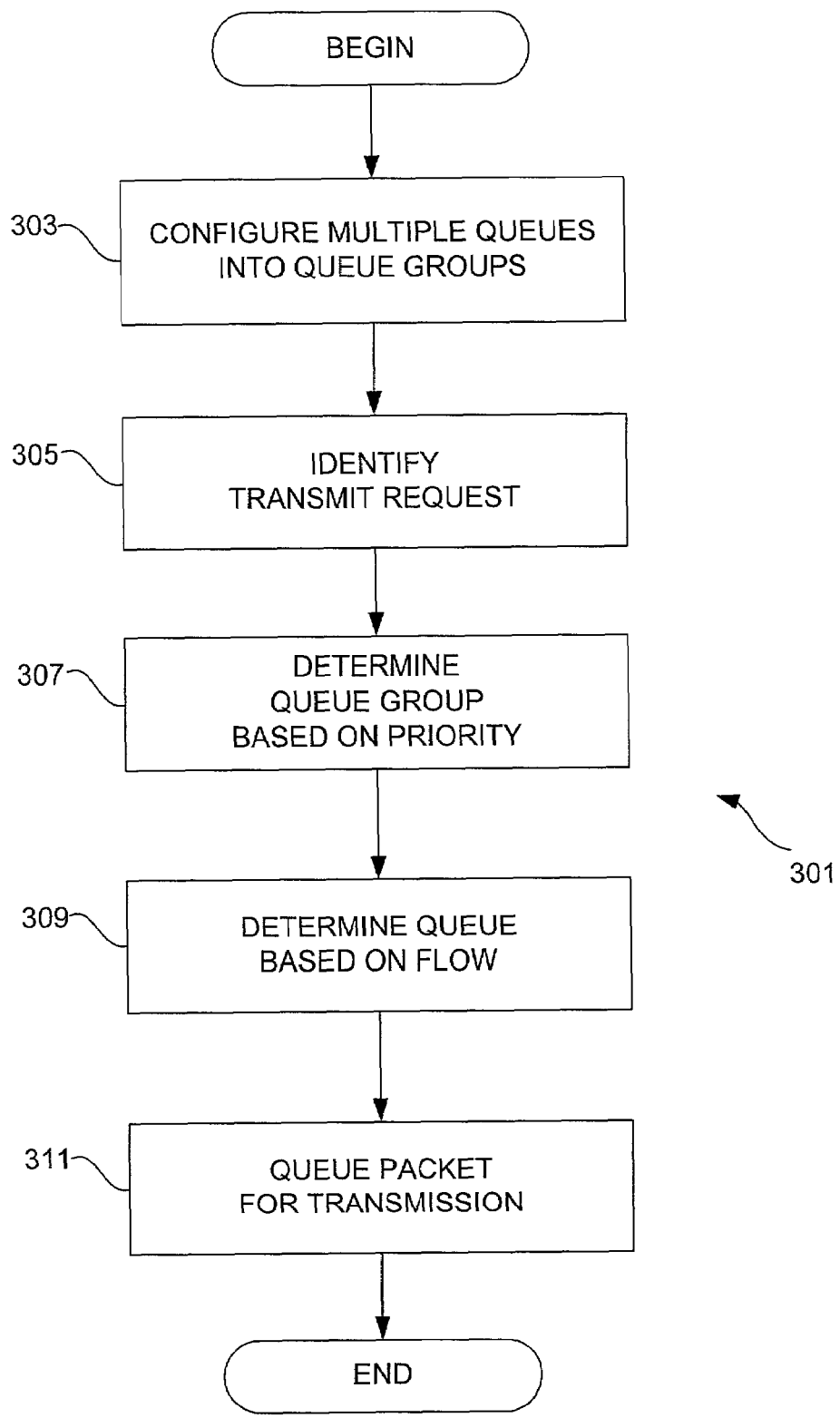
FIG. 3 is a flow diagram illustrating the flow of events in an implementation of one embodiment of a process in accordance with the teachings of the present invention.

With reference now primarily to FIG. 3, a flow of events in the implementation of a process 301 embodying aspects the present invention is shown. In one embodiment in accordance with the teachings of the present invention, the flow of events illustrated in FIG. 3 may be embodied in the form of a set of machine-readable instructions comprising a part of the device driver discussed above. In one embodiment, the device driver may be stored in the memory 213, the storage 221, or received by the machine 201 via the communications interface 219 (see, e.g., FIG. 2). The process 301 begins with a configuration of the multiple transmit queues provided by the communications interface 219 by defining a plurality (e.g., two or more) of transmit queues per priority level, or group of priority levels, (see, e.g., process block 303) to generate one or more queue groups (e.g., a group of transmit queues defined to correspond to a particular priority level or set of priority levels). It will be appreciated that in various embodiments of the present invention, multiple transmit queues may be defined for one or more priority levels, while defining only a single queue for other priority levels, without departing from the spirit of the invention.

As transmit requests, each corresponding to a packet, for example, are received by the "send packet" function of the device driver on a plurality of processors (e.g., processors 203, 205, 207, and 209) in a multiprocessor system (see, e.g., process block 305), the queue group corresponding to the packet's priority level may be determined (see, e.g., process block 307). Using the example above wherein the network adapter provides for sixteen transmit queues, and the communications protocol provides eight levels of priority, a total of eight queue groups, each comprising two transmit queues, may be provided, each queue group corresponding to a particular priority level designation, or set of priority level designations. Following a determination of the appropriate queue group based on the packet's priority designation, the process 301 proceeds to determine the appropriate transmit queue within the queue group in which to queue the packet to await transmission on the network (see, e.g., process block 309).

As mentioned previously, some popular transmission protocols (e.g., TCP) are designed such that the packet order may be important, and should therefore be considered in a determination of which transmit queue is appropriate for a particular packet. The theory being, that if all packets from a given flow are queued in the same transmit queue, the packet order will be preserved and the likelihood of dropped packets will be minimized. Since packets corresponding to a common flow will be designated with the same priority level, they are already destined to be queued within the same queue group. A determination of the specific transmit queue within a given queue group may be based on an identifying characteristic associated with the packet, preferably a characteristic common to a given flow of packets.

For example, in one embodiment in accordance with the teachings of the present invention, a destination media access control ("MAC") address may be used as the identifying characteristic for selecting a transmit queue within a given queue group. With respect to the example given above wherein each queue group includes two transmit queues, a hashing algorithm for example, may consider the last bit of the destination MAC address to determine which transmit queue of the two available transmit queues within the queue group is appropriate. Table 1, below, lists the possible hexadecimal digits that may comprise the destination MAC address in one embodiment, and the value corresponding to each of the four bits representing each hexadecimal digit. As the reader will appreciate, the value of the last bit will always be either "0" or "1," and may be defined to correspond to the two available transmit queues within the queue group, respectively. Since the destination MAC address will be identical for all packets corresponding to a common flow, all packets from the flow will be queued in the same transmit queue within the queue group, thereby maintaining packet order. It will be appreciated that other identifying characteristics may also be utilized to determine the specific transmit queue for a given packet.

TABLE 1

| Hexadecimal | Binary |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| A | 1010 |
| B | 1011 |
| C | 1100 |
| D | 1101 |
| E | 1110 |
| F | 1111 |
| Value: | 8421 |

After the specific transmit queue, within the queue group, has been determined (see, e.g., block 309), then the packet may be queued to await transmission on the network (see, e.g., process block 311) be accessing the queue-specific resources of the "send packet" function of the device driver.

It will be appreciated that a greater number of transmit queues may also be defined for a given priority level, or that different numbers of transmit queues may be defined for different priority levels based on anticipated transmit requests for a given priority level, or to ensure that higher priority packets are being transmitted as quickly as possible (e.g., define a greater number of transmit queues for higher priority levels than lower priority levels). In these various scenarios, the hashing algorithm discussed above may consider a greater number of bits of the destination MAC address for example. In one instance, if four transmit queues are defined for a given priority level, then consideration of the last two bits of the destination MAC address will hash to four different possible values (e.g., 0, 1, 2, and 3), which may be defined to correspond to the four available transmit queues. If all sixteen available transmit queues are defined for a single priority level (e.g., a non-priority indicating protocol is in use), then consideration of the last four bits of the destination MAC address will hash to sixteen possible values (e.g., 0–15), which may be defined to correspond to the sixteen available transmit queues corresponding to that priority level or queue group. One skilled in the art will recognize that various other hashing, lookup, or other algorithms, that may encompass one or more portions of the packets, such as the destination IP address or TCP port, in addition to or instead of the destination MAC address, may be used in various embodiments in accordance with the teachings of the present invention.

Figure 4:
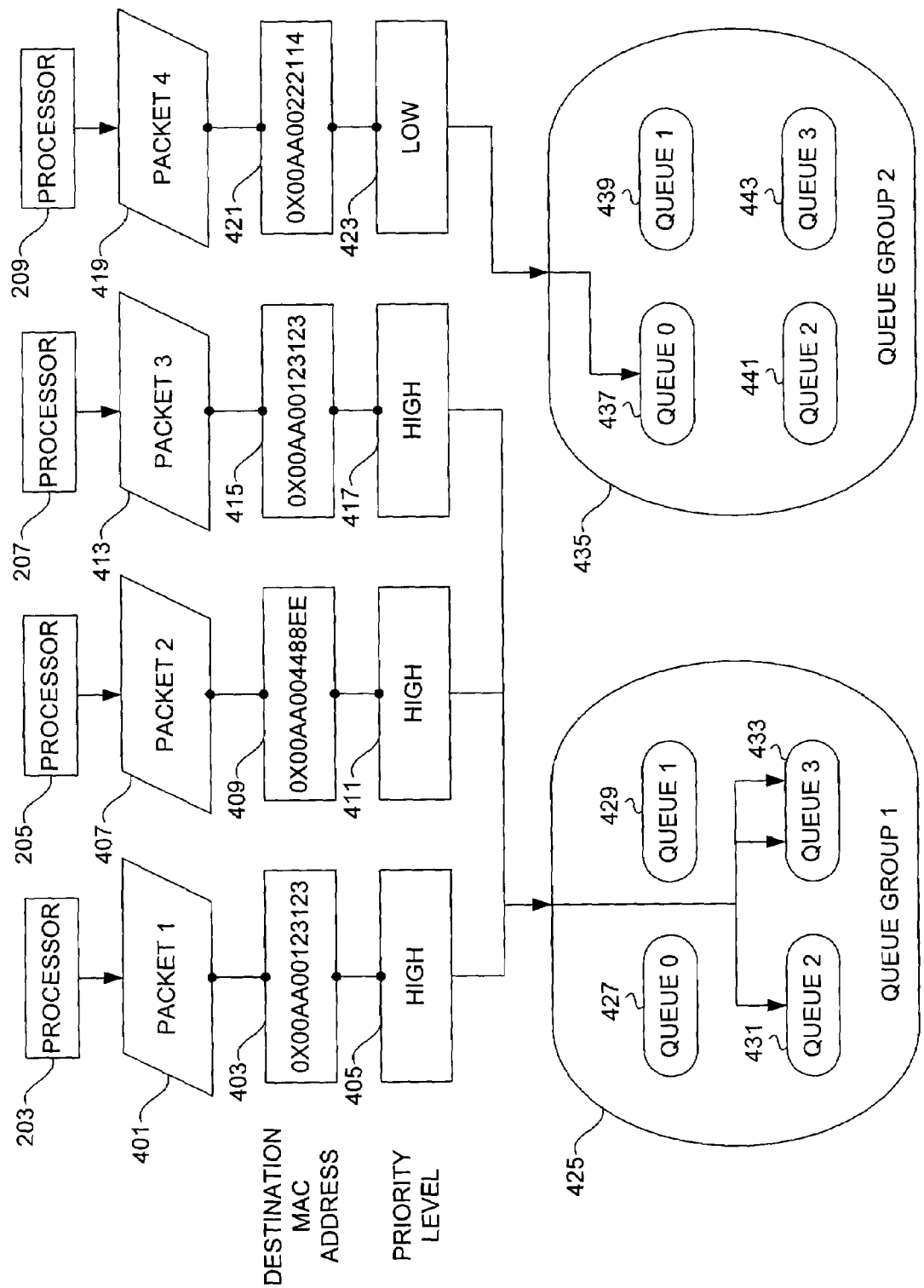
FIG. 4 is a pictorial block diagram illustrating how multiple packets may be processed and queued in an embodiment of a multiprocessor system in accordance with the teachings of the present invention.

With reference now primarily to FIG. 4, a pictorial representation of how packets may be processed and queued in an embodiment of a multiprocessor system in accordance with the teachings of the present invention is shown. For purposes of illustrating aspects of the present invention, assume that the client 101 (see, e.g., FIG. 1) is configured in a manner such as that illustrated in FIG. 2 with four processors 203, 205, 207, and 209 capable of receiving transmit requests generated from applications, user input, or otherwise. Assume also that the communications interface 219 (see, e.g., FIG. 2) is designed to provide a total of eight transmit queues 427, 429, 431, 433, 437, 439, 441, and 443, which, at system initialization, are configured by the device driver to define four transmit queues for a "high" priority level queue group 425 (e.g., queue group 1, or "the first queue group") and a "low" priority level queue group 435 (e.g., queue group 2, or "the second queue group"), respectively, for example. The two priority levels may correspond to priority levels associated with a communications protocol, for example, or may correspond to a system-specific configuration, or the like.

With continued reference to the embodiment illustrated in FIG. 4, a transmit request, corresponding to a packet, is received at each of the four processors 203, 205, 207, and 209 substantially simultaneously. A first packet 401, including a destination MAC address 403 and a priority designation 405, is received at the first processor 203. A second packet 407, including a destination MAC address 409 and a priority designation 411, is received at the second processor 205. A third packet 413, including a destination MAC address 415 and a priority designation 417, is received at the third processor 207, and a fourth packet 419, including a destination MAC address 421 and a priority designation 423, is received at the fourth processor 209. It will be appreciated that in another embodiment of the present invention, the client 101 (see, e.g., FIG. 1) may include only a single processor with multiple threads, thereby facilitating the receipt of multiple transmit requests substantially simultaneously.

As mentioned above in conjunction with FIG. 3, the appropriate queue group (e.g., based on the defined priority levels) may be determined with reference to the respective priority designation given to a particular packet. For example, the first packet 401 has a priority designation 405 of "High" and is consequently placed in the first queue group 425. Similarly, the second packet 407 and the third packet 413 also have priority designations 411, and 417, respectively, of "High" and are also assigned to the first queue group 425. The fourth packet 419, on the other hand, has a priority designation 423 of "Low" and is consequently assigned to the second queue group 435. Determining the specific transmit queue within the queue group then becomes a matter of hashing the destination MAC address to a value corresponding to one of the available transmit queues 427, 429, 431, 433, 437, 439, 441, and 443 within the respective queue groups 425 and 435, in an embodiment. Using the example described above in conjunction with FIG. 3, where four transmit queues are available in a given queue group, such as they are in the example illustrated in FIG. 4, the last two bits of the destination MAC address may be used to assign the packet to a specific transmit queue. The first packet 401, with a destination MAC address 403 ending with the hexadecimal digit "3," includes "0011" as the final four bits of the address 403. Using the values assigned to each of the last two bits (e.g., "11") in Table 1, a value of 3 may be calculated (e.g., one for the last bit, plus two for the preceding bit), which may be defined to correspond to a third transmit queue 433 within the first queue group 425 in an embodiment.

Having determined which transmit queue (e.g., the third transmit queue 433) the first packet 401 should be queued in to await transmission on the network 109 (see, e.g., FIG. 1), the processor 203 must acquire the queue-specific resources of the device driver's "send packet" function associated with the third transmit queue 433. In this example, the queue-specific resources of the "send packet" function associated with the third transmit queue 433 are not currently being used and consequently, the first packet 401 may be queued in the third transmit queue 433 so that it may be accessed by the communications interface 219 (see, e.g., FIG. 2) and transmitted on the network 109 in due course.

Concurrently, while the first packet 401 is being processed by the first processor 203, the second packet 407 may be processed by the second processor 205. The second packet 407 includes a destination MAC address 409 ending with the hexadecimal digit "E," which corresponds to the four bits "1110" (see, e.g., Table 1). Using the last two bits (e.g., "10"), and the values associated with them in Table 1, a value of 2 may be calculated, which, in the illustrated embodiment, corresponds to a second transmit queue 431 within the first queue group 425. As with the first processor 203, the second processor, having determined the appropriate transmit queue (e.g., the second transmit queue 431) for the second packet 407, will attempt to acquire the queue-specific resources of the device driver's "send packet" function associated with the second transmit queue 431. Since no other processor is currently utilizing these resources, the second processor 205 may acquire them and queue the second packet 407 in the second transmit queue 431.

Processing and queuing these two packets of equal priority in parallel enables the multiprocessor machine 201 (see, e.g., FIG. 2) to function more efficiently be decreasing acquisition time of queue-specific resources. By permitting packets of equal priority to be queued in different transmit queues, instances of processor "busy waits," while attempting to acquire a spinlock, may be reduced. It will be appreciated however, that equal priority packets from different flows may also be queued in the same transmit queue, depending on the calculated value from the hashing algorithm, or other queue-assignment mechanism.

Continuing with the foregoing example, the third packet 413, with a destination MAC address 415 ending with the hexadecimal digit "3," also corresponds to the third transmit queue 433 within the first queue group 425. The reader will note that the destination MAC address 415 of the third packet 413 is identical to the destination MAC address 403 of the first packet 401, indicating that both are destined to the same client (e.g., the client 103 of FIG. 1) on the network 109, and should therefore be queued in the same transmit queue in order to prevent transmission of out-of-order packets. In this case, the third processor 207, having determined that the third packet 413 corresponds to the third transmit queue 433, will attempt to acquire the queue-specific resources of the device driver's "send packet" function associated with the third transmit queue 433. Because these resources are already in use by the first processor 203, the third processor 207 will not be permitted to acquire the resources, and will have to "spin" and wait for the resources to be released by the first processor 203. This ensures that the packets will be deposited in the transmit queue and transmitted in order to enable them to be received in order, to the extent possible, by the destination client on the network 109.

In a manner similar to that described above, the fourth packet 419 will be processed to determine the appropriate transmit queue within the second queue group 435 by evaluating the last two bits of the destination MAC address 421, namely "00" (corresponding to "0100," the four bits corresponding to the hexadecimal digit "4"). In this case, the last two bits hash to a value of "0," which may be defined to correspond to the zero transmit queue 437 within the second queue group 435. The fourth processor 209 will then acquire the resources associated with the zero transmit queue 437, as above, and queue the fourth packet 419 to await transmission on the network 109. The reader will appreciate that any number of transmission scenarios may be used to actually send the queued packets. In one scenario, the communications interface 219 may be configured to access the four transmit queues 427, 429, 431, and 433 of the first queue group 425 in sequence until all high priority packets have been transmitted, and only then access the transmit queues 437, 439, 441, and 443 of the second queue group 435 in order to transmit the lower priority packets on the network 109. In another scenario, two packets may be transmitted from high-priority transmit queues for every one packet transmitted from a low-priority transmit queue, for example.

While the invention is described and illustrated here in the context of a limited number of embodiments, the invention may be embodied in many forms without departing from the spirit of the essential characteristics of the invention. The illustrated and described embodiments, including what is described in the abstract of the disclosure, are therefore to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A method, comprising:
   defining at least two transmit queues for a priority level group;
   receiving at least two transmit requests substantially simultaneously; and
   wherein, if the at least two transmit requests correspond to packets from separate flows, the packets having a priority designation corresponding to the priority level group, then processing the at least two transmit requests substantially in parallel and queuing the packets separately in the at least two transmit queues;
   wherein, if the at least two transmit requests correspond to packets from a common flow, then processing the at least two transmit requests substantially in series and queuing the packets together in one of the at least two transmit queues.

2. The method of claim 1, wherein the priority level group corresponds to at least one communication protocol priority level.

3. The method of claim 1, wherein the priority level group comprises a single priority level.

4. The method of claim 1, wherein the priority level group comprises two or more priority levels.

5. A method, comprising:
   defining at least two transmit queues to correspond to at least one priority level receiving at least two transmit requests at a send packet function of a device driver substantially simultaneously, the at least two transmit requests corresponding to at least two packets;

assigning each of the at least two packets to a queue group in response to a priority designation, the queue group comprising the at least two transmit queues corresponding to the at least one priority level;

assigning each of the at least two packets to one of the at least two transmit queues in response to a flow characteristic; and wherein, if the at least two packets correspond to different queue assignments, then processing the at least two transmit requests substantially in parallel and queuing the at least two packets separately in the at least two transmit queues;

wherein assigning each of the at least two packets to one of the at least two transmit queues comprises correlating an output generated by an algorithm with a defined value associated uniquely with each of the at least two transmit queues.

6. The method of claim 5, wherein the priority designation corresponds to a communication protocol priority level.

7. The method of claim 5, wherein the flow characteristic comprises at least a portion of a destination address associated with each of the at least two packets.

8. The method of claim 5, wherein assigning each of the at least two packets to a queue group comprises correlating the priority designation with at least one priority level associated uniquely with the queue group.

9. The method of claim 5, wherein the algorithm comprises a hashing algorithm.

10. An apparatus, comprising:

a plurality of processors; and a memory, coupled to the plurality of processors, to store a plurality of instructions, the memory configured to provide at least two transmit queues accessible by the communications interface, and wherein execution of the instructions by the plurality of processors causes the apparatus to:

define the at least two transmit queues for a priority level group;

receive, substantially simultaneously, a plurality of transmit requests at the plurality of processors, each of the transmit requests corresponding to a packet having a priority designation and a flow characteristic; and process the two or more transmit requests substantially in series and queue the packets together in one of the at least two transmit queues in response to a determination that the packets have equivalent flow characteristics;

wherein, if two or more of the plurality of transmit requests correspond to packets having distinct flow characteristics, the packets having a priority designation corresponding to the priority level group, then process the two or more of the plurality of transmit requests substantially in parallel and queue the packets separately in the at least two transmit queues.

11. The apparatus of claim 10, wherein the priority level group corresponds to at least one communication protocol priority level.

12. The apparatus of claim 10, wherein the priority level group comprises a single priority level.

13. The apparatus of claim 10, wherein the priority level group comprises two or more priority levels.

14. The apparatus of claim 10, wherein the priority designation corresponds to a communication protocol priority level.

15. The apparatus of claim 10, wherein the flow characteristic comprises at least a portion of a destination address associated with each packet.

16. An article of manufacture, comprising:

a machine-readable medium that provides instructions, which, when executed by a machine, cause the machine to:

define at least two transmit queues for a priority level group;

receive at least two transmit requests substantially simultaneously; and process the at least two transmit requests substantially in series and queue the packets together in one of the at least two transmit queues in response to a determination that the at least two transmit requests correspond to packets from a common flow;

wherein, if the at least two transmit requests correspond to packets from separate flows, the packets having a priority designation corresponding to the priority level group, then processing the at least two transmit requests substantially in parallel and queuing the packets separately in the at least two transmit queues.

17. The article of manufacture of claim 16, wherein the priority level group corresponds to at least one communication protocol priority level.

18. The article of manufacture of claim 16, wherein the priority level group comprises a single priority level.

19. The article of manufacture of claim 16, wherein the priority level group comprises two or more priority levels.

20. An article of manufacture, comprising:

a machine-readable medium that provides instructions, which, when executed by a machine, cause the machine to:

define at least two transmit queues to correspond to at least one priority level;

receive at least two transmit requests at a send packet function of a device driver substantially simultaneously, the at least two transmit requests corresponding to at least two packets;

assign each of the at least two packets to a queue group in response to a priority designation, the queue group comprising the at least two transmit queues corresponding to the at least one priority level;

assign each of the at least two packets to one of the at least two transmit queues in response to a flow characteristic; and wherein, if the at least two packets correspond to different queue assignments, then process the at least two transmit requests substantially in parallel and queue the at least two packets separately in the at least two transmit queues;

wherein assigning each of the at least two packets to one of the at least two transmit queues comprises correlating an output generated by an algorithm with a defined value associated uniquely with each of the at least two transmit queues.

21. The article of manufacture of claim 20, wherein the priority designation corresponds to a communication protocol priority level.

22. The article of manufacture of claim 20, wherein the flow characteristic comprises at least a portion of a destination address associated with each of the at least two packets.

23. The article of manufacture of claim 20, wherein assigning each of the at least two packets to a queue group comprises correlating the priority designation with at least one priority level associated uniquely with the queue group.

24. The article of manufacture of claim 20, wherein the algorithm comprises a hashing algorithm.

* * * * *

UNITED STATES PATENT AND TRADEMARK OFFICE
CERTIFICATE OF CORRECTION

| | | |
|---|---|---|
| PATENT NO. | : 7,039,061 B2 | Page 1 of 1 |
| APPLICATION NO. | : 09/963284 | |
| DATED | : May 2, 2006 | |
| INVENTOR(S) | : Connor et al. | |

It is certified that error appears in the above-identified patent and that said Letters Patent is hereby corrected as shown below:

In column 7, at line 37, delete "be" and insert --by--.
In column 10, at line 51, delete "parallel" and insert --series--.
In column 10, at line 52, delete "separately" and insert --together--.
In column 10, at line 52, after "in" insert --one of--.
In column 10, at line 67, after "level" insert --;--.

Signed and Sealed this

Thirtieth Day of October, 2007

JON W. DUDAS
*Director of the United States Patent and Trademark Office*